（12）United States Patent
Hong et al.

(10) Patent No.: US 7,787,351 B2
(45) Date of Patent: Aug. 31, 2010

(54) BIT RECORDING PROCESS ON FERROELECTRIC MEDIUM USING PROBE OR SMALL CONDUCTIVE STRUCTURE AND RECORDING MEDIUM THEREOF

(75) Inventors: Seung Bum Hong, Seongnam-si (KR);
Yun Seok Kim, Seongnam-si (KR);
Kwang Soo No, Seongnam-si (KR);
Sung Hoon Choa, Seoul (KR); Simon Buehlmann, Yongin-si (KR); Ji Yoon Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 540 days.

(21) Appl. No.: 11/851,028

(22) Filed: Sep. 6, 2007

(65) Prior Publication Data

US 2008/0180832 A1    Jul. 31, 2008

(30) Foreign Application Priority Data

Jan. 25, 2007    (KR)    ...................... 10-2007-0008059

(51) Int. Cl.
G11B 7/00    (2006.01)

(52) U.S. Cl. ...................................... 369/126; 369/47.1
(58) Field of Classification Search ....................... None
See application file for complete search history.

(56) References Cited

U.S. PATENT DOCUMENTS 5,481,527 A * 1/1996 Kasanuki et al. ............ 369/126
7,447,140 B2 * 11/2008 Lutwyche et al. ........... 369/126

* cited by examiner

Primary Examiner—Muhammad N. Edun
(74) Attorney, Agent, or Firm—Sughrue Mion, PLLC

(57) ABSTRACT

A method of recording bits on a ferroelectric medium using a scanning probe or a small conductive structure and a recording medium thereof, in which bit sizes can be decreased to increase data recording density as well as to reduce losses in reproduction signals. The method includes applying switching voltages to a lower electrode of the ferroelectric medium and the probe so as to write bits while approaching the probe to or bringing the probe into contact with a surface of the ferroelectric medium; and applying a base bias voltage, which is equal or smaller in magnitude and opposite in sign to the switching voltages between the switching voltages to make the probe equipotential with an upper portion of the record medium.

26 Claims, 5 Drawing Sheets

BIT RECORDING PROCESS ON FERROELECTRIC MEDIUM USING PROBE OR SMALL CONDUCTIVE STRUCTURE AND RECORDING MEDIUM THEREOF

CROSS-REFERENCE TO RELATED PATENT APPLICATIONS

This application claims priority from Korean Patent Application No. 10-2007-0008059 filed on Jan. 25, 2007 in the Korean Intellectual Property Office, the disclosure of which is incorporated herein in its entirety by reference.

BACKGROUND OF THE INVENTION

1. Field of the Invention

Methods and apparatuses consistent with the present invention relate to a bit recording process on a ferroelectric medium using a probe or a small conductive structure and a recording medium thereof, in which a bit size can be decreased to increase data recording density as well as to reduce losses occurring to reproduction signals.

2. Description of the Prior Art

In response to booming Internet-related technologies, various record media capable of storing a massive amount of data including dynamic images have been developed. In addition, user demands to freely use data stored in such record media while moving are an important factor that drives a next generation information storage market. Not only the record media capable of storing a massive amount of data but also means for reading the data from the record media are essential in the information storage media market.

To date, portable non-volatile data storage devices generally include solid-state memory devices such as flash memories and disk-type memory devices such as hard disks. The solid-state memory devices are expected to have a recording capacity up to about several giga bytes GB in several years, but still can hardly be used as massive data record storage devices. However, it is still expected that the solid-state memory devices will be used as memory devices for high-speed operations in present personal computers, and the hard-disk type memory devices will be used for main storage devices.

A common magnetic hard disk mounted on a portable device is expected to have a capacity of about 20 giga bytes in the near future. However, it is also expected difficult to obtain higher magnetic recording density owing to "superparamagnetism."

Recent approaches are introducing new memory devices which use a scanning probe as recording and reproducing means and a ferroelectric medium as a record medium.

According to such a technology using a scanning probe or Scanning Probe Microscopy (SPM) technology, it is possible to probe a microscopic area of several to tens of nano-meters with the scanning probe. Furthermore, the ferroelectric medium used as the record medium is not influenced by superparamagnetism unlike magnetic storage media. Accordingly, it is possible to increase recording density of SPM memory devices over the magnetic record media.

However, memory devices introduced to date, in particular, which use a ferroelectric medium as a data-recording material layer have a drawback in that the bit size is limited by a probe and a recording process causes variations in surface potential (reproduction signals).

That is, in the related art, when bits are recorded on a ferroelectric medium in the form of a thin film, it is impossible to record bits at a size smaller than that of a probe (P. Paruch et al., Appl. Phys. Lett. 79, 530 (2001)). Moreover, the probe remaining in a contact state right after a recording operation disadvantageously changes potential which is used as reproduction signals in a probe data storage device.

SUMMARY OF THE INVENTION

Accordingly, the present invention has been made to address the above-mentioned problems occurring in the related art, and provides a bit recording method on a ferroelectric medium using a probe or a small conductive structure, in which a bit size can be decreased to increase data recording density as well as to reduce losses occurring to reproduction signals.

The present invention also provides a ferroelectric bit recording medium using a probe or small conductive structure, which can reduce a bit size to increase data recording density as well as to reduce losses occurring to reproduction signals.

The present invention also provides a bit recording method on a ferroelectric medium using a probe or small conductive structure, which can adopt an over-write scheme and apply a base bias for preventing pattern distortion in order to address the problems of the related art.

The present invention also provides a ferroelectric bit recording medium using a probe or small conductive structure, which can adopt an over-write scheme and apply a base bias for preventing pattern distortion in order to address the problems of the related art.

According to an aspect of the present invention for accomplishing the foregoing aspect, the invention provides a method of recording bits on a ferroelectric medium using a scanning probe, the method comprising: applying switching voltages to a lower electrode of the ferroelectric medium and the probe so as to write bits while approaching the probe to or bringing the probe into contact with a surface of the ferroelectric medium; and applying a base bias voltage, which is equal or smaller in magnitude and opposite in sign to the switching voltages between the switching voltages to make the probe equipotential with an upper portion of the record medium.

Preferably, but not necessarily, the base bias voltage has a value between a negative value of the switching voltages and a ground voltage when a bit '0' is written, and a value between the ground voltage and a positive value of the switching voltages when a bit '1' is written.

According to another aspect of the present invention, the present invention provides a method of recording bits on a ferroelectric medium using a scanning probe, the method comprising: applying switching voltages to a lower electrode and the probe so as to write bits while approaching the probe to or bringing the probe into contact with a surface of the ferroelectric medium, wherein the switching voltages are applied using an over-write scheme in which the written bits overlap with each other.

Preferably, but not necessarily, the switching voltages are applied using the over-write scheme when a condition of $L \leq B$ is satisfied, and a bit '0' and a bit '1' are to be continuously written, where L denotes a bit length and B denotes a bit size without over-write.

Preferably, but not necessarily, the switching voltages are applied using the over-write scheme when a condition of $L \leq B$ is satisfied, and a bit '0' and a bit '1' are to be discontinuously written, where L denotes a bit length and B denotes a bit size without over-write.

Preferably, but not necessarily, when a condition of $L > B$ is satisfied, and a bit '0' and a bit '1' are to be continuously written, where L denotes a bit length and B denotes a bit size when the bits are not over-written, a base bias voltage, which is equal or smaller in magnitude and opposite in sign to the switching voltages, is applied between the switching voltages, and the switching voltages are applied using the over-write scheme.

Preferably, but not necessarily, when a condition of L>B is satisfied, and a bit '0' and a bit '1' are to be discontinuously written, where L denotes a bit length and B denotes a bit size when the bits are not over-written, a base bias voltage, which is equal or smaller in magnitude and opposite in sign to the switching voltages, is applied between the switching voltages, and the switching voltages are applied using the over-write scheme.

According to yet another aspect of the present invention, the present invention provides a method of recording bits on a ferroelectric medium using a scanning probe, the method comprising: applying switching voltages to a lower electrode and the probe so as to write bits while approaching the probe to or bringing the probe into contact with a surface of the ferroelectric medium; applying a base bias voltage, which is equal or smaller in magnitude and opposite in sign to the switching voltages between the switching voltages to make the probe equipotential with an upper portion of the record medium, wherein the switching voltages are applied using an over-write scheme in which the written bits overlap with each other.

Preferably, but not necessarily, the base bias voltage has a value between a negative value of the switching voltages and a ground voltage when a bit '0' is written, and a value between the ground voltage and a positive value of the switching voltages when a bit '1' is written.

Preferably, but not necessarily, the switching voltages are applied using the over-write scheme when a condition of L≦B is satisfied, and a bit '0' and a bit '1' are to be continuously written, where L denotes a bit length and B denotes a bit size without over-write.

Preferably, but not necessarily, the switching voltages are applied using the over-write scheme when a condition of L≦B is satisfied, and a bit '0' and a bit '1' are to be discontinuously written, where L denotes a bit length and B denotes a bit size without over-write.

Preferably, but not necessarily, the base bias voltage is applied between the switching voltages, and the switching voltages are applied using the over-write scheme when a condition of L>B is satisfied, and a bit '0' and a bit '1' are to be continuously written, where L denotes a bit length and B denotes a bit size without over-write.

Preferably, but not necessarily, the base bias voltage is applied between the switching voltages, and the switching voltages are applied using the over-write scheme when a condition of L>B is satisfied, and a bit '0' and a bit '1' are to be discontinuously written, where L denotes a bit length and B denotes a bit size without over-write.

In view of the foregoing, based on the method of using an over-write scheme and applying a base bias voltage to prevent distortion, it may be possible to prevent any variation (distortion) of potential (reproduction signals), record at small bit sizes, thereby increasing recording density while reducing losses in reproduction signals or creation of noises.

BRIEF DESCRIPTION OF THE DRAWINGS

The above and other aspects of the present invention will be more apparent from the following detailed description taken in conjunction with the accompanying drawings, in which.

DETAILED DESCRIPTION OF EXEMPLARY EMBODIMENTS

The following detailed description will now present a bit recording method on a ferroelectric medium and a record medium thereof according to exemplary embodiments of the invention in conjunction with the accompanying drawings, in which pulse sizes and timings are exaggerated for the sake of clarity.

Figure 1:
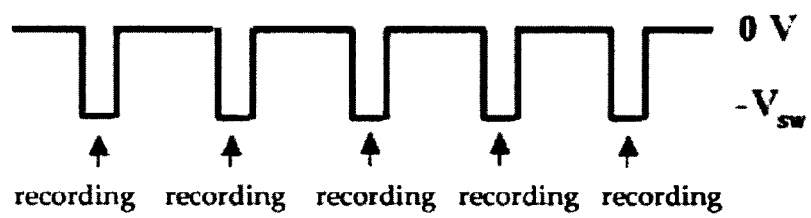
FIG. 1 is a diagram illustrating a related art bit recording method.
Figure 2:
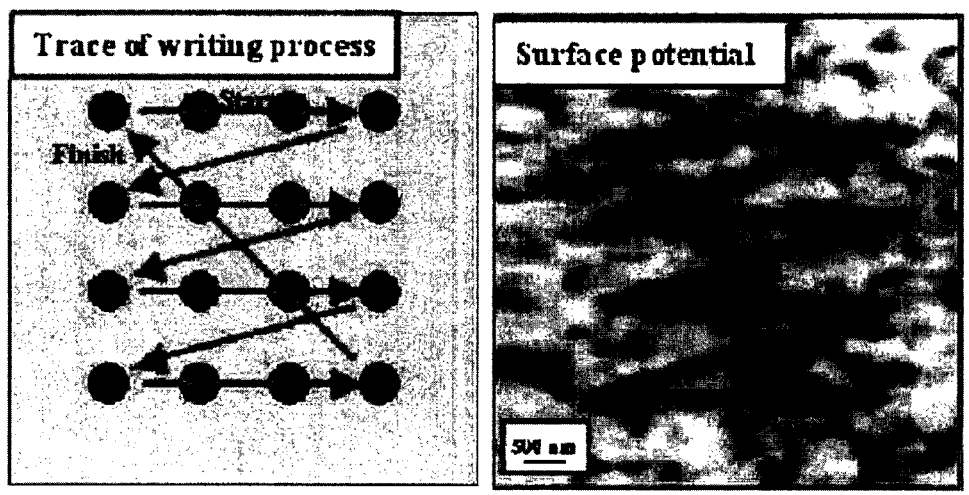
FIG. 2 is an image and picture illustrating variations in potential (reproduction signals) according to a related art bit recording method.

FIG. 1 is a diagram illustrating a related art bit recording method, where '$V_{SW}$' denotes a switching voltage. In the related art bit recording method as shown in FIG. 1, the recording has been performed without considering bit sizes and reproduction signal variations. The related art recording method causes variations in potential (reproduction signals) as shown in FIG. 2 and a limited minimum size of bits as shown in FIG. 3.

According to the related art recording method, right after $V_{SW}$ is applied as shown in FIG. 1, a probe remains in a contact state. When the probe in the contact state like this moves over the surface of a ferroelectric medium on which data was recorded already, a potential difference is caused between the upper surface of the ferroelectric medium and the probe. In more detail, when bits are formed on the ferroelectric medium, shielded charges are caused accordingly in an upper portion of the ferroelectric medium. As the probe in the contact state moves over the ferroelectric medium, it creates a potential change to cause equipotential between the probe and the shielding charges. Such a potential change creates a change in a reproduction signal. That is, this may increase the loss of the reproduction signal or increase noises thereof.

Figure 3:
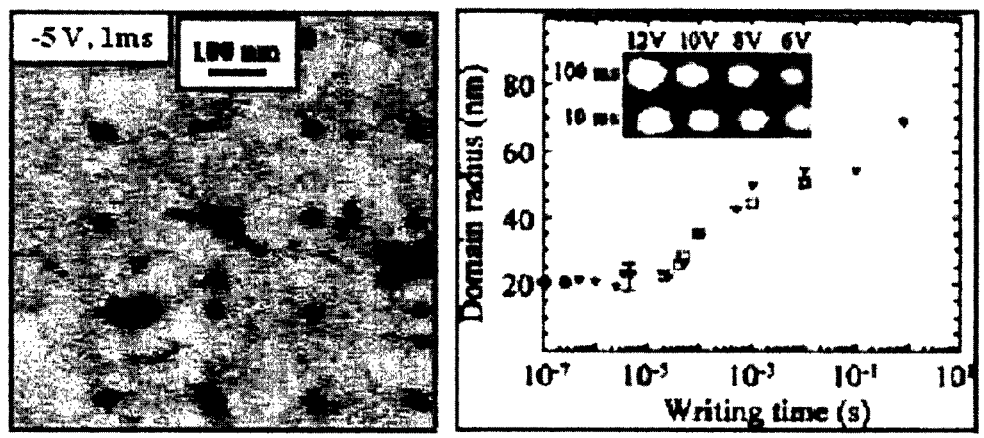
FIG. 3 is a picture and graph illustrating bit size limit according to a related art method.

FIG. 3 is a picture and graph illustrating a bit size limit according to a related art method. In the related art recording method, the minimum size of bits is determined by the size of a probe used to record the bits. The left part of FIG. 3 is a picture illustrating an example related with such a bit size limit, and the right part of FIG. 3 is a graph illustrating the bit size limit (Appl. Phys. Lett. 79, 530 (2001), by P. Paruch et al.)

Figure 4:
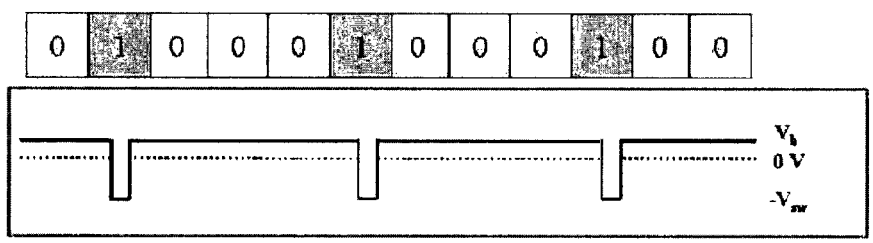
FIG. 4 is a diagram illustrating a bit recording method on a ferroelectric medium using a probe according to an exemplary embodiment of the invention, which is designed to prevent variations in reproduction signals (potential)

FIG. 4 is a diagram illustrating a bit recording method on a ferroelectric medium using a probe according to an exemplary embodiment of the invention, which is designed to prevent variations in reproduction signals (potential).

According to the invention, in order to prevent the variations in the reproduction signals (potential), a bias voltage $V_b$ is applied between switching voltages $V_{SW}$ which are applied for bit recording. Here, the bias voltage $V_b$ does not exceed the switching voltages $V_{SW}$ and has an opposite symbol. The bias voltage $V_b$ also acts to cause the probe and the upper portion of the ferroelectric medium to be equipotential. The bias voltage $V_b$ has a value between a negative switching voltage $-V_{SW}$ and a ground voltage 0 V in the case of recording '0' bit, but a value between the ground voltage 0 V and a positive switching voltage $+V_{SW}$ in the case of recording '1' bit.

Figure 5:
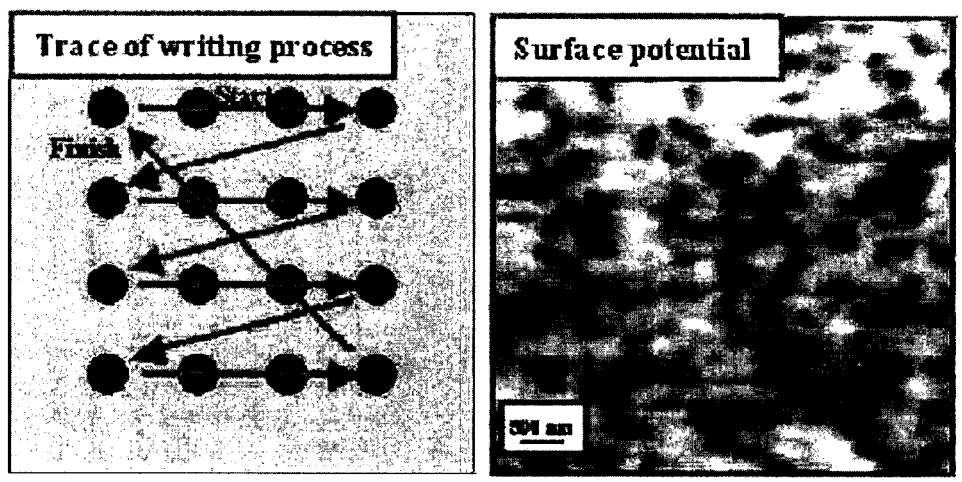
FIG. 5 illustrates an example of FIG. 4.

FIG. 5 illustrates an exemplary embodiment of FIG. 4.

By applying the bias voltage $V_b$ between the switching voltages $V_{SW}$, which has a value not exceeding the switching voltages $V_{SW}$ but an opposite symbol, it is possible to prevent variations in potential (reproduction signals) shown in FIG. 2.

Figure 6:
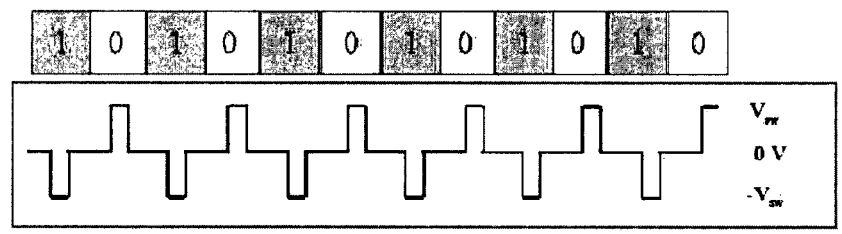
FIG. 6 is a diagram illustrating a bit recording method on a ferroelectric medium using a probe according to an exemplary embodiment of the invention, which is designed to reduce bit size.

FIG. 6 is a diagram illustrating a bit recording method on a ferroelectric medium using a probe according to an exemplary embodiment of the invention, which is designed to reduce a bit size.

As an exemplary embodiment of the present invention, an over-write scheme is devised in order to reduce a bit size. By over-writing recording bits, it is possible to record the bits at a smaller size.

Figure 7:
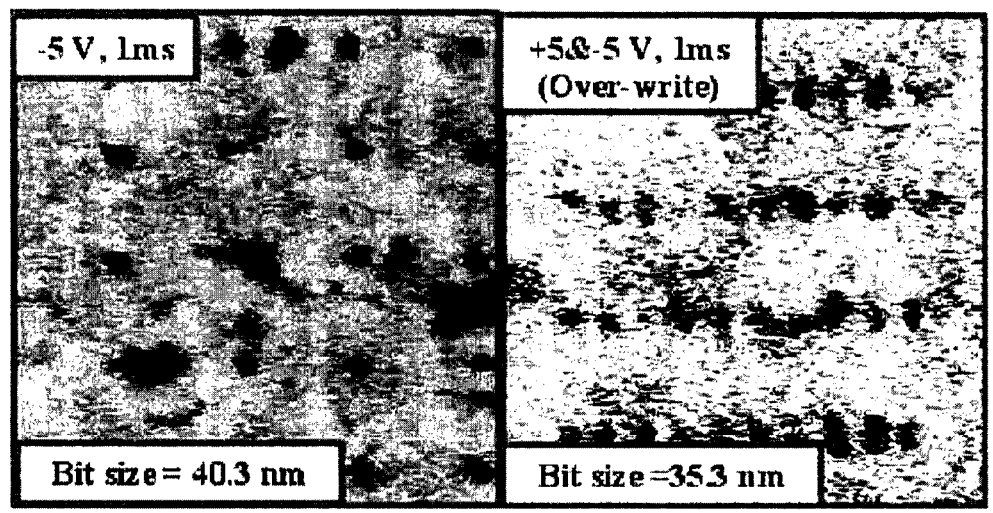
FIG. 7 is an image picture illustrating record media recorded by a recording method of the prior art (in the left) and the bit recording method of FIG. 6 (in the right)

FIG. 7 is an image picture illustrating record media recorded by a recording method of a related art (in the left) and the bit recording method of FIG. 6 according to an exemplary embodiment of the present invention (in the right).

In the case of the related art recording method (the left part of FIG. 7), it is difficult to write bits at a probe size (40 nm) or less. However, it is possible to record bits at the probe size or less according to the over-write scheme of the exemplary embodiment of the present invention.

Figure 8:
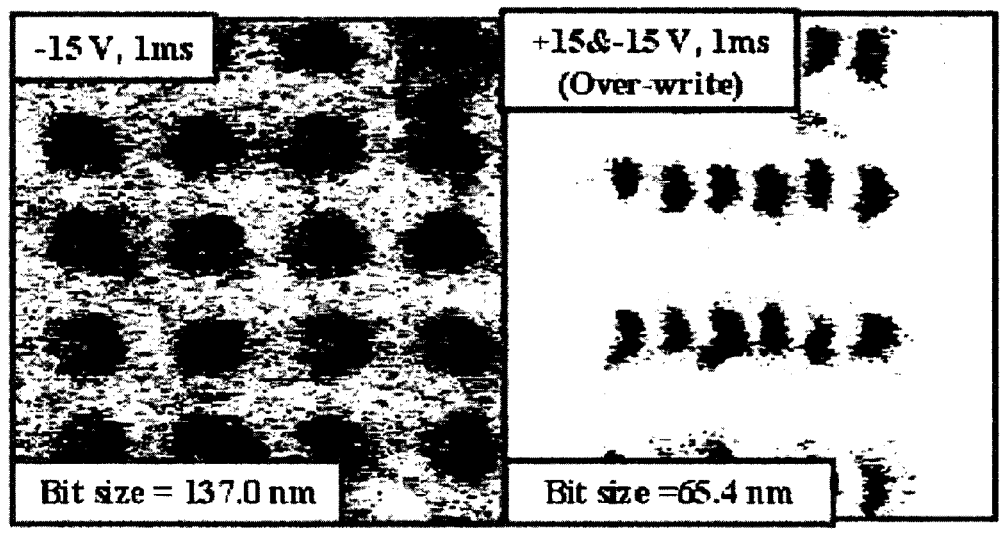
FIG. 8 is an image picture illustrating record media recorded by a recording method of the prior art (in the left) and the bit recording method of FIG. 6 (in the right) in order to show bit size reduction owing to an over-write scheme.

FIG. 8 is an image picture illustrating bit size reduction owing to an over-write scheme, in which a record medium recorded by a recording method of a related art is shown in the left of FIG. 8 and a record medium recorded by the bit recording method of FIG. 6 is shown in the right of FIG. 8.

The recording methods as shown in FIGS. 4 and 6 can be applied variably according to a size relation of L (bit length) and B (bit size without over-write) and a recording bit type.

Figure 9:
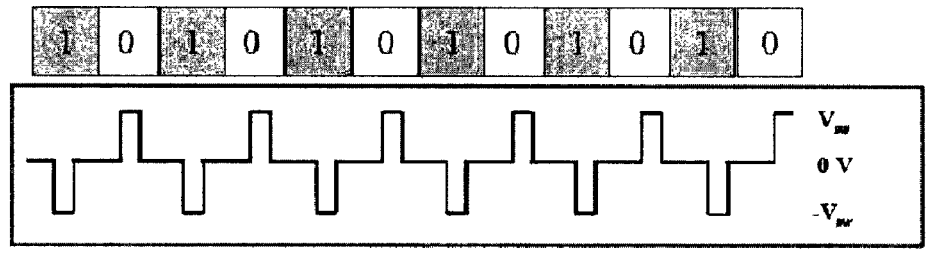
FIG. 9 is a diagram illustrating a recording method according to an exemplary embodiment of the present invention, in which '0' and '1' bits are recorded continuously in the case of L (bit length)≦B (bit size without over-write)
Figure 10:
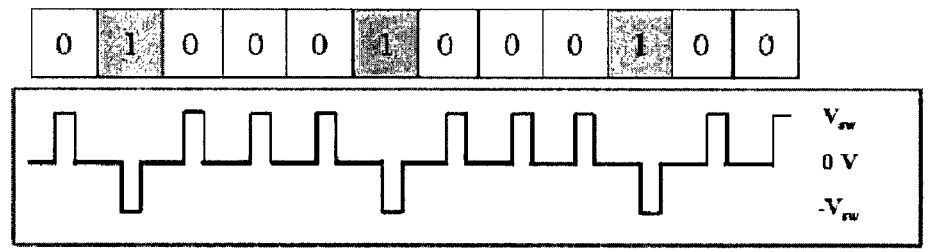
FIG. 10 is a diagram illustrating a recording method according to an exemplary embodiment of the present invention, in which '0' and '1' bits are recorded discontinuously in the case of L≦B.
Figure 11:
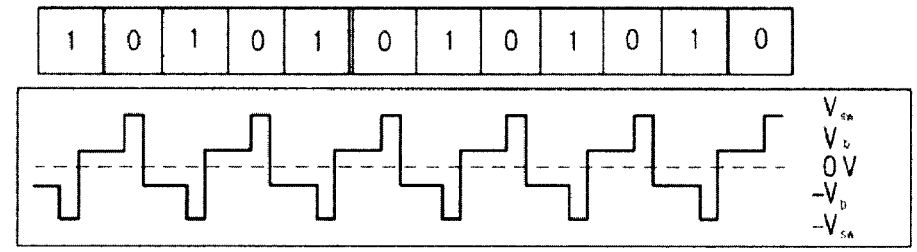
FIG. 11 is a diagram illustrating a recording method according to an exemplary embodiment of the present invention, in which '0' and '1' bits are recorded continuously in the case of L>B.
Figure 12:
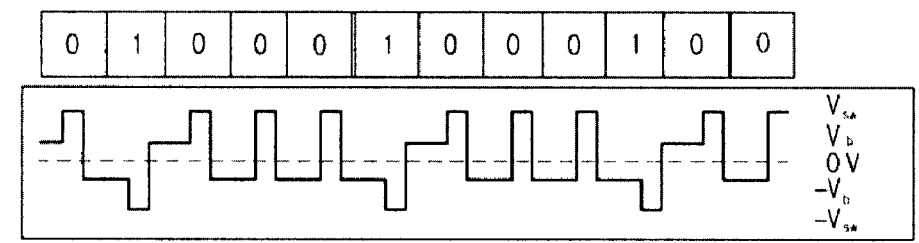
FIG. 12 is a diagram illustrating a recording method according to an exemplary embodiment of the present invention, in which '0' and '1' bits are recorded discontinuously in the case of L>B.

In the case of L≦B, '0' and '1' recorded continuously are shown in FIG. 9, and '0' and '1' recorded discontinuously are shown in FIG. 10. In the case of L>B, 0 and 1 recorded continuously are shown in FIG. 11, and '0' and '1' recorded discontinuously are shown in FIG. 12.

The bit recording method on a ferroelectric medium using a probe of according to an exemplary embodiment of the invention is applied to a memory device which includes a data-recordable ferroelectric record medium on a lower electrode and a probe for writing or reading data onto/from the record medium, and applies switching voltages $V_{SW}$ to the lower electrode and the probe while approaching or contacting the probe to a surface of the record medium, wherein a base bias voltage $V_b$ is applied between the switching voltages $V_{SW}$, the base voltage $V_b$ having a value not exceeding the switching voltages $V_{SW}$ and having an opposite symbol. Then, the probe and an upper portion of the record medium are made to be equipotential to prevent any variations (distortions) in potential (reproduction signals) and bits are over-written to reduce a bit size.

Preferably, but not necessarily, the base bias voltage $V_b$ has a value between a negative switching voltage $-V_{SW}$ and a ground voltage 0V in a case where '0' bits are recorded, and a value between the ground voltage 0V and a positive switching voltage $+V_{SW}$ in a case where '1' bits are recorded.

In the case of L≦B (L is a bit length, B is a bit size when not over-written), where '0' and '1' have to be recorded continuously, the switching voltages $V_{SW}$ are over-written so that bits are overlapped with each other as shown in FIG. 9.

In the case of L≦B, where '0' and '1' have to be recorded discontinuously, the switching voltages $V_{SW}$ are over-written so that bits are overlapped with each other as shown in FIG. 10.

In the case of L>B, where '0' and '1' have to be recorded continuously, a base bias voltage $V_b$ of the opposite symbol, which has a value not exceeding the switching voltages $V_{SW}$, is applied between the switching voltages $V_{SW}$ and overwriting is executed so that bits are overlapped with each other as shown in FIG. 11.

In addition, in the case of L>B, where '0' and '1' have to be recorded discontinuously, a base bias voltage $V_b$ of the opposite symbol, which has a value not exceeding the switching voltages $V_{SW}$, is applied between the switching voltages $V_{SW}$ and over-writing is executed so that bits are overlapped with each other as shown in FIG. 12.

In view of the foregoing, according to the bit recording method on a ferroelectric medium using a probe or small conductive structure and the record medium according to exemplary embodiments of the present invention, an overwrite scheme is used while a base bias is applied to prevent record pattern distortion in order to prevent variations in potential (reproduction signals) as well as to allow the use of small bit sizes. Therefore, according to the invention, it is possible to record small bit sizes on a record medium, thereby raising record density and reducing losses in reproduction signals or creation of noises.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A method of recording bits on a ferroelectric medium using a scanning probe, the method comprising:
    applying switching voltages to a lower electrode of the ferroelectric medium and the probe so as to write bits while approaching the probe to or bringing the probe into contact with a surface of the ferroelectric medium; and
    applying a base bias voltage, which is equal or smaller in magnitude and opposite in sign to the switching voltages between the switching voltages to make the probe equipotential with an upper portion of the record medium.

2. The method of claim 1, wherein the base bias voltage has a value between a negative value of the switching voltages and a ground voltage when a bit '0' is written, and a value between the ground voltage and a positive value of the switching voltages when a bit '1' is written.

3. A ferroelectric record medium on which bits are recorded using a scanning probe, the record medium being manufactured using the method of claim 2.

4. A ferroelectric record medium on which bits are recorded using a scanning probe, the record medium being manufactured using the method of claim 1.

5. A method of recording bits on a ferroelectric medium using a scanning probe, the method comprising:
applying switching voltages to a lower electrode and the probe so as to write bits while approaching the probe to or bringing the probe into contact with a surface of the ferroelectric medium,
wherein the switching voltages are applied using an over-write scheme in which the written bits overlap with each other.

6. The method of claim 5, wherein the switching voltages are applied using the over-write scheme when a condition of $L \leq B$ is satisfied, and a bit '0' and a bit '1' are to be continuously written, where L denotes a bit length and B denotes a bit size when the bits are not over-written.

7. A ferroelectric record medium on which bits are recorded using a scanning probe, the record medium being manufactured using the method of claim 6.

8. The method of claim 5, wherein the switching voltages are applied using the over-write scheme when a condition of $L \leq B$ is satisfied, and a bit '0' and a bit '1' are to be discontinuously written, where L denotes a bit length and B denotes a bit size when the bits are not over-written.

9. A ferroelectric record medium on which bits are recorded using a scanning probe, the record medium being manufactured using the method of claim 8.

10. The method of claim 5, wherein, when a condition of $L > B$ is satisfied, and a bit '0' and a bit '1' are to be continuously written, where L denotes a bit length and B denotes a bit size when the bits are not over-written, a base bias voltage, which is equal or smaller in magnitude and opposite in sign to the switching voltages, is applied between the switching voltages, and the switching voltages are applied using the over-write scheme.

11. A ferroelectric record medium on which bits are recorded using a scanning probe, the record medium being manufactured using the method of claim 10.

12. The method of claim 5, wherein, when a condition of $L > B$ is satisfied, and a bit '0' and a bit '1' are to be discontinuously written, where L denotes a bit length and B denotes a bit size when the bits are not over-written, a base bias voltage, which is equal or smaller in magnitude and opposite in sign to the switching voltages, is applied between the switching voltages, and the switching voltages are applied using the over-write scheme.

13. A ferroelectric record medium on which bits are recorded using a scanning probe, the record medium being manufactured using the method of claim 12.

14. A ferroelectric record medium on which bits are recorded using a scanning probe, the record medium being manufactured using the method of claim 5.

15. A method of recording bits on a ferroelectric medium using a scanning probe, the method comprising:
applying switching voltages to a lower electrode and the probe so as to write bits while approaching the probe to or bringing the probe into contact with a surface of the ferroelectric medium;
applying a base bias voltage, which is equal or smaller in magnitude and opposite in sign to the switching voltages between the switching voltages to make the probe equipotential with an upper portion of the record medium, wherein the switching voltages are applied using an over-write scheme in which the written bits overlap with each other.

16. The method of claim 15, wherein the base bias voltage has a value between a negative value of the switching voltages and a ground voltage when a bit '0' is written, and a value between the ground voltage and a positive value of the switching voltages when a bit '1' is written.

17. A ferroelectric record medium on which bits are recorded using a scanning probe, the record medium being manufactured using the method of claim 16.

18. The method of claim 15, wherein the switching voltages are applied using the over-write scheme when a condition of $L \leq B$ is satisfied, and a bit '0' and a bit '1' are to be continuously written, where L denotes a bit length and B denotes a bit size when the bits are not over-written.

19. A ferroelectric record medium on which bits are recorded using a scanning probe, the record medium being manufactured using the method of claim 18.

20. The method of claim 15, wherein the switching voltages are applied using the over-write scheme when a condition of $L \leq B$ is satisfied, and a bit '0' and a bit '1' are to be discontinuously written, where L denotes a bit length and B denotes a bit size when the bits are not over-written.

21. A ferroelectric record medium on which bits are recorded using a scanning probe, the record medium being manufactured using the method of claim 20.

22. The method of claim 15, wherein, when a condition of $L > B$ is satisfied, and a bit '0' and a bit '1' are to be continuously written, where L denotes a bit length and B denotes a bit size when the bits are not over-written, the base bias voltage is applied between the switching voltages, and the switching voltages are applied using the over-write scheme.

23. A ferroelectric record medium on which bits are recorded using a scanning probe, the record medium being manufactured using the method of claim 15.

24. The method of claim 15, wherein, when a condition of $L > B$ is satisfied, and a bit '0' and a bit '1' are to be discontinuously written, where L denotes a bit length and B denotes a bit size when the bits are not over-written, the base bias voltage is applied between the switching voltages, and the switching voltages are applied using the over-write scheme.

25. A ferroelectric record medium on which bits are recorded using a scanning probe, the record medium being manufactured using the method of claim 24.

26. A ferroelectric record medium on which bits are recorded using a scanning probe, the record medium being manufactured using the method of claim 22.

* * * * *